United States Patent [19]

Richardson

[11] 4,424,639
[45] Jan. 10, 1984

[54] FISHING ROD HANDLE AND FASTENER

[76] Inventor: Donald J. Richardson, 15972 Dudley Rd., Brown City, Mich. 48416

[21] Appl. No.: 277,204

[22] Filed: Aug. 25, 1981

[51] Int. Cl.³ .............................................. A01K 87/00
[52] U.S. Cl. ......................................... 43/18.1; 43/22; 43/23
[58] Field of Search ............................ 43/18.1, 22, 23; 403/355, 356; 81/177 R, 177 G; 269/99, 100, 23

[56] References Cited

U.S. PATENT DOCUMENTS

| | | | |
|---|---|---|---|
| D. 228,759 | 10/1973 | Ohmura | D22/23 |
| 1,041,858 | 10/1912 | Normoyle | 81/177 G |
| 2,409,516 | 10/1946 | Rosenthal et al. | 151/32 |
| 2,709,470 | 5/1955 | Knohl | 151/37 |
| 2,783,838 | 3/1957 | Ericson | 269/23 |
| 2,839,863 | 6/1958 | Heffel | 43/22 |
| 3,426,466 | 2/1969 | Shepherd | 43/22 |
| 4,026,060 | 5/1977 | Barnes | 43/22 |
| 4,040,463 | 8/1977 | Petrus | 151/41.75 |

Primary Examiner—Nicholas P. Godici
Assistant Examiner—Richard K. Seidel
Attorney, Agent, or Firm—Basile, Weintraub & Hanlon

[57] ABSTRACT

A fishing rod handle and fastener for releasably securing a reel and rod to a handle. The handle is constructed and arranged to engage a mounting foot of a fishing reel when the reel is positioned on the handle. A reel retaining element is arranged to abut the foot of the reel for retaining the reel on the handle. A threaded screw engages the reel retaining element in a manner to permit only partial withdrawal of the screw from the reel retaining element preventing loss of the screw or the reel retaining element. The reel retaining element may be loosened to position the reel foot between the retainer element and the rod handle or remove the reel foot therefrom.

7 Claims, 7 Drawing Figures

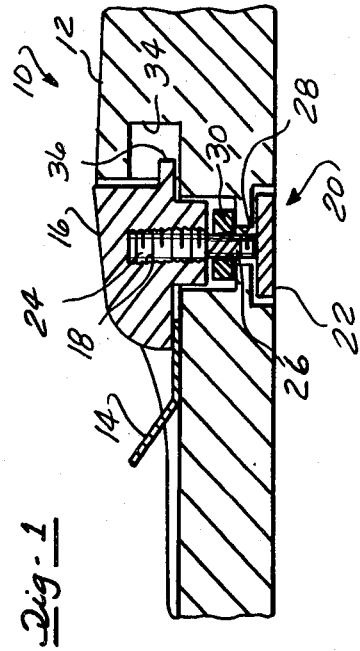
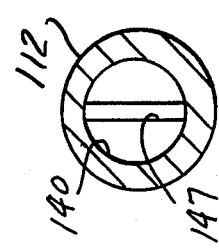
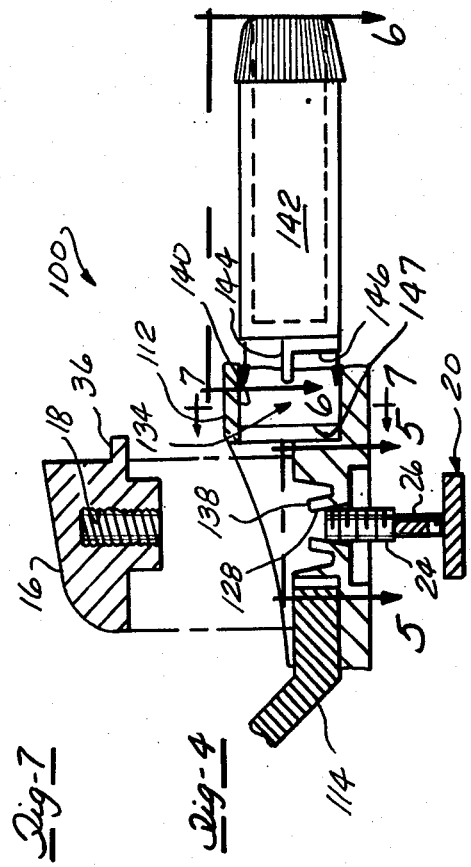
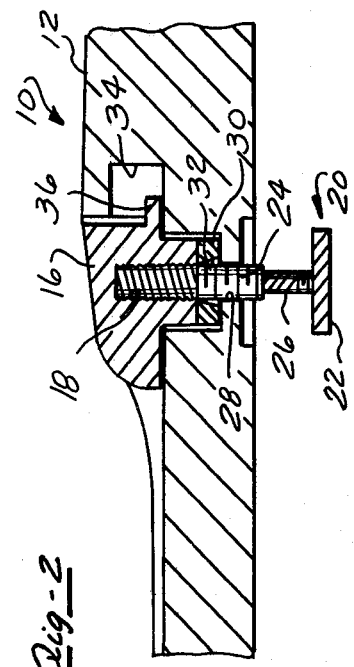
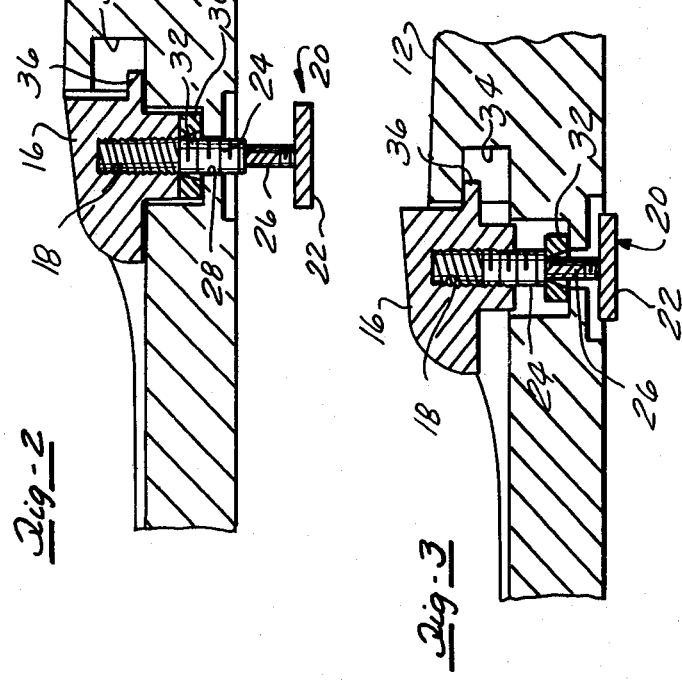
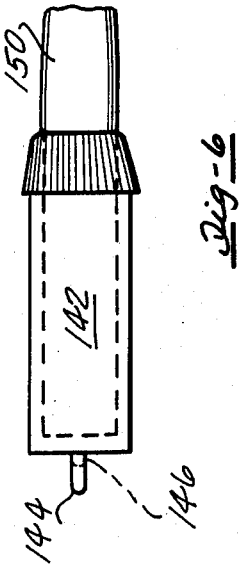

FISHING ROD HANDLE AND FASTENER

BACKGROUND OF THE INVENTION

1. Field of the Invention

The present invention generally relates to the field of fishing rods and, in particular, the present invention is concerned with devices for attaching a fishing reel to a fishing rod handle. Even more particularly the present invention is concerned with a device for releasably attaching a fishing reel and a fishing rod to a fishing rod handle.

2. Description of the Prior Art

Avid fisherman frequently find it desirable while fishing to change their fishing reel or rod or both rod and reel. In the process of changing a rod or reel, the elements used for releasably attaching the rod or reel to the fishing rod handle may become lost. Examples of devices in the prior art for releasably attaching a fishing reel and/or rod to a handle are disclosed in the U.S. Pat. Nos. DES. 228,759; 2,409,516; 2,709,470; 2,839,863; 3,426,466; and 4,026,060. These patents are relevant to the present invention in that they represent the closest prior art for releasably securing a reel to a fishing rod handle. They do not however anticipate nor disclose a projection formed on a reel retaining element which is engageable with a recess formed in the handle with the axial length of the recess limiting the axial movement of the reel retaining element to permit only a partial withdrawal of a screw from the reel retaining element to prevent the disassembly of the rod and reel retaining device.

SUMMARY OF THE INVENTION

The present invention, which will be described in greater detail hereinafter, comprises in combination a fishing rod handle and fastener for releasably securing a fishing reel and rod to the handle. The device of the present invention is constructed and arranged to engage a mounting foot of the fishing reel when the reel is positioned on the handle and comprises: a reel retaining element arranged to abut the foot of the reel; a threaded bore formed in the reel retaining element; a screw having a head and a threaded shank threadingly engageable with the threaded bore, a recess formed along the shank adjacent the head; a bore formed in the handle to receive the screw; a radially expandable ring positioned between the handle and the reel retaining element, with a central bore formed in the ring which is expandable to pass over the threaded shank. When the threaded shank is tightened in the threaded bore the expandable ring is moved to the shank recess to axially retain the screw in the bore. This permits only partial withdrawal of the screw once the fastener has been tightened, and the retaining element may be loosened to position a reel foot between the retainer element and the rod handle or remove the reel foot therefrom.

It is therefore a primary object of the present invention to provide a new and improved fishing rod handle to releasably support a fishing reel and a fishing rod.

It is a further object of the present invention to provide such a device that has no loose pieces that can be lost during the installation or removal of a reel from the handle.

It is an additional object of the present invention to provide a device for releasably securing a fishing rod and fishing reel to a fishing rod handle that allows angular alignment of the rod with the handle.

It is yet another object of the present invention to provide a device for releasably securing a fishing reel and a fishing rod to a fishing rod handle that prevents rotation of the rod relative to the handle.

Further objects, advantages, and applications of the present invention will become apparent to those skilled in the art of fishing devices when the accompanying description of one example of the best mode contemplated for practicing the invention is read in conjunction with the accompanying drawing.

BRIEF DESCRIPTION OF THE DRAWING

The description herein makes reference to the accompanying drawing wherein like reference numbers refer to like parts throughout the various several views and wherein:

FIG. 1 illustrates a cross sectional view of a fishing rod handle of the present invention with the foot of a fishing reel releasably secured thereto;

FIG. 2 illustrates a fishing rod handle of FIG. 1 with the screw for securing the rod retaining means partially installed;

FIG. 3 illustrates the fishing rod handle of FIG. 1 with the fishing reel foot released;

FIG. 4 illustrates a second embodiment of the present invention with provision for releasably securing a fishing rod to the handle;

FIG. 5 illustrates a view of a portion of the handle illustrated in FIG. 4 taken along the line 5—5 of FIG. 4;

FIG. 6 illustrates a top view of the hozzle of FIG. 4 taken along the line 6—6 of FIG. 4; and FIG. 7 illustrates a cross sectional view generally taken along line 7—7 in FIG. 4.

DESCRIPTION OF THE PREFERRED EMBODIMENTS

Referring now to the drawing, there is illustrated in FIG. 1 one example of the present invention at 10 in the form of a fishing rod handle 12 for releasably securing a fishing reel foot 14 to the handle. As shown in FIG. 1 a reel retaining element 16 is arranged to abut the reel foot 14 and hold the foot between the retaining element 16 and the handle 12. A threaded bore 18 is formed in the retaining element 16 to receive a screw 20 which will be described in more detail subsequently. The screw 20 includes a head 22, a threaded shank 24, and a recess 26 formed along the shank adjacent the head 22. A bore 28 is formed in the handle to receive the shank 24 of the screw 20.

In assembling the reel retaining element 16 to the handle, as shown in FIG. 2 of the drawing, a radially expandable ring 30 is positioned between the handle 12 and the retaining element 16, and a central bore 32 formed in the ring is expandable to pass over the threaded shank 24 of the screw 20. When the threaded shank 24 is tightened in the threaded bore 18 the expandable ring 30 is moved to the shank recess 26 which axially retains the screw 20 in the bore 28 as shown in FIGS. 1 and 3 of the drawing. The radially expandable ring 30 is preferably split radially at one place along its circumference between the outside diameter and the bore 32 to aid in the radial expansion, and the bore 32 is preferably tapered to aid in the insertion of the shank 24 during the assembly process. The recess 26, the bore 28, and the radially expandable ring 30 when assembled as shown in FIGS. 1 and 3 define the means for axially retaining the screw 22 in the bore 28.

As can best be shown in FIG. 3 of the drawing, a handle recess 34 is formed in the handle 12 adjacent the bore 28, and a projection 36 is formed on the reel retaining element 16 and is slidingly engageable with the recess 34. The axial length of the recess 34 is limited to restrict the axial movement of the reel retaining element 16 and permit only partial withdrawal of the threaded shank 24 once the device has been assembled as shown in FIG. 1. FIG. 3 illustrates the extent to which the threaded shank 24 may be withdrawn once the assembly has been completed. Limiting the axial movement of the reel retaining element 16 to permit only partial withdrawal of the screw 22 once the fastener has been tightened allows the loosening of the retaining element 16 to position the reel foot 14 between the retainer element 16 and the rod handle 12 or to remove the reel foot 14 from the handle.

FIG. 4 of the drawing illustrates at 100 a preferred embodiment of the present invention which comprises a handle 112 for releasably securing a reel foot 114 and a rod 150 to the handle 112. The handle 112 includes a tapered bore 128 which is tapered inward to engage the threaded shank 24 of the screw 20. At least one radially movable finger 138 is formed at a small diameter end of the bore 128. The finger 138 is moved radially outward as the threaded shank 24 enters the threaded bore 18, and the finger 138 enters the recess 26 as the screw 20 is tightened. Once the finger 138 has entered the recess 26 the screw 20 is axially retained in the bore 128.

A recess 134 is formed in the handle 112 to slidingly receive the projection 36, and the length of the recess 134 restricts the axial movement of the reel retaining element 16 to permit only partial withdrawal of the threaded shank 24 from the threaded bore 18 and prevent disassembly of the reel retaining element 16 from the shank 24 thus avoiding the loss of parts due to such disassembly. A horizontal bore 140 is formed in the handle 112 to slidingly receive a hozzle 142 which holds the end of a fishing rod or pole. Horizontal projection 144 is formed at the end of the hozzle 142 and slidingly engages the recess 134 and is sandwiched between the handle 112 and the retaining element 16 so that when the retaining element 16 is tightened the horizontal projection 144 is squeezed between the retaining element 16 and the handle 112 to securely retain the hozzle 142 on the handle 112.

The hozzle 142 further includes a radial projection 146 which extends radially across the end of the hozzle and is slidingly engageable with a radial recess 147 formed in the end of the bore 140. When the radial projection 146 is in engagement with the recess 147 the hozzle 142 is oriented angularly with the handle 112 and angular rotation of the hozzle 142 relative to the handle 112 is prevented.

There has been described herein a fishing rod handle for releasably retaining a fishing reel and a fishing rod. The device of the present invention allows the fishing reel and the fishing rod to be attached and removed from the handle without detaching any of the retaining elements and risking the loss of parts in the process.

It should be understood by those skilled in the art of fishing rods that other forms of the Applicant's invention may be had, all coming within the spirit of the invention and the scope of the appended claims.

Having thus described my invention what I claim is:

1. In combination a fishing rod handle and fastener for releasably securing a reel and rod to said handle constructed and arranged to engage a mounting foot of said reel when said reel is positioned on said handle comprising:
   a reel retaining element arranged to abut the foot of the reel;
   a threaded bore formed in said reel retaining element;
   a screw having a head and a threaded shank threadingly engageable with said threaded bore, a recess formed along the shank adjacent the head;
   a bore formed in said handle to receive said screw;
   means for axially retaining said screw in said bore, said means for axially retaining said screw in said bore comprising:
   said bore tapered inward to engage said threaded shank;
   at least one radially moveable finger formed at a small diameter end of said bore;
   and whereby said finger is moved radially outward as said threaded shank enters said threaded bore and said finger enters said recess as said screw is tightened to axially retain said screw in said bore;
   means for releasably securing the rod to said handle; and
   means for limiting axial movement of said reel retaining element to permit only partial withdrawal of said screw once said fastener has been tightened whereby said retaining element may be loosened to position a reel foot between said retainer element sand said rod handle or remove the reel foot therefrom.

2. The combination as defined in claim 1 wherein the means for limiting axial movement of said reel retaining means comprises:
   a handle recess formed in said handle adjacent said bore;
   a projection formed on said reel retaining element engageable with said handle recess; and
   whereby the axial length of said handle recess is limited to restrict the axial movement of said reel retaining element to permit only partial withdrawal of said threaded shank.

3. In combination a fishing rod handle and fastener for releasably securing a reel and rod to said handle constructed and arranged to engage a mounting foot of said reel when said reel is positioned on said handle comprising:
   a reel retaining element arranged to abut the foot of the reel;
   a threaded bore formed in said reel retaining element;
   a screw having a head and a threaded shank threadingly engageable with said threaded bore, a recess formed along the shank adjacent the head;
   a bore formed in said handle to receive said screw;
   means for axially retaining said screw in said bore, said means for axially retaining said screw in said bore comprising;
   a radially expandable ring positioned between said handle and said reel retaining element, a central bore formed in said ring, said bore expandable to pass over the threaded shank;
   and whereby when said threaded shank is tightened in said threaded bore said expandable ring is moved to said shank recess to axially retain said screw in said bore;

means for releasably securing the rod to said handle said means for releasably securing a rod to said handle comprising:
  a horizontal bore formed in said handle;
  a hozzle having a bore formed therein and having an outside diameter slidingly engageable with said horizontal bore;
  said rod fixedly engaged in said hozzle bore;
  a horizontal projection formed on an end of said hozzle, said horizontal projection engageable with said handle recess and sandwiched between said handle and said projection; and
  whereby tightening of said screw in said threaded bore retains said hozzle by squeezing said horizontal projection between said projection and said handle; and
  means for limiting axial movement of said reel retaining element to permit only partial withdrawal of said screw once said fastener has been tightened whereby said retaining element may be loosened to position a reel foot between said retainer element and said rod handle or remove the reel foot therefrom, said means for limiting axial movement of said reel retaining means comprising:
  a handle recess formed in said handle adjacent said bore;
  a projection formed on said reel retaining element engageable with said handle recess; and
  whereby the axial length of said handle recess is limited to restrict the axial movement of said reel retaining element to permit only partial withdrawal of said threaded shank.

4. The combination as defined in claim 2 wherein the means for releasably securing a rod to said handle comprises:
  a horizontal bore formed in said handle
  a hozzle having a bore formed therein and having an outside diameter slidingly engageable with said horizontal bore;
  said rod fixedly engaged in said hozzle bore;
  a horizontal projection formed on an end of said hozzle, said horizontal projection engageable with said handle recess and sandwiched between said handle and said projection; and
  whereby tightening of said screw in said threaded bore retains said hozzle by squeezing said horizontal projection between said projection and said handle.

5. The combination as defined in claim 4 further comprising a radial projection formed on said hozzle, said radial projection slidingly engageable with said handle recess, and wherein when said radial projection is engaged with said handle recess angular movement of said hozzle relative to the handle is prevented.

6. In combination, a fishing rod handle and fastener for releasably securing a reel and rod to said handle and to angularly align said rod with said handle and prevent relative rotation of said rod with respect to said handle comprising:
  a retaining element;
  a threaded bore formed in said retaining element;
  a screw having a head and threaded shank engageable with said threaded bore, a recess formed along the shank adjacent the head;
  a bore formed in said handle to receive said screw;
  an inward directed radially moveable finger provided along said bore;
  said finger moved radially away from said threaded shank as said screw enters said threaded bore, said finger entering said recess when said retaining element is tightened;
  a projection formed on said retaining element;
  a recess formed in said handle slidingly engageable with said projection;
  said recess being limited in length to limit the axial movement of said projection and prevent withdrawal of said threaded shank;
  a horizontal bore formed in said handle to receive an end of said rod;
  a radial projection formed on the rod end;
  a radial recess formed in the bottom of said horizontal bore
  a horizontal projection extending outward from said radial projection; and
  wherein said radial projection is engageable with said radial recess to align said rod angularly with said handle, and said horizontal projection and a portion of said reel foot sandwiched between said retaining element and said handle to releasably secure said rod to said handle.

7. A device for releasably securing a fishing rod to a handle and angularly aligning said rod to said handle comprising:
  a horizontal bore formed in said handle
  a rod end slidingly engageable with said horizontal bore;
  a radial recess formed in the bottom of said bore;
  a radial projection formed on said rod end engageable with said radial recess to angularly align said rod with said handle;
  a horizontal projection formed on said rod end; and
  retaining means for releasably squeezing said horizontal projection against said handle to releasably secure said rod to said handle.

* * * * *